United States Patent
Blackson

(10) Patent No.: US 8,684,263 B1
(45) Date of Patent: *Apr. 1, 2014

(54) AUTOMATED BANKING MACHINE THAT OPERATES RESPONSIVE TO DATA BEARING RECORDS

(71) Applicant: Diebold, Incorporated, North Canton, OH (US)

(72) Inventor: Dale Blackson, Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/782,882

(22) Filed: Mar. 1, 2013

Related U.S. Application Data

(60) Continuation of application No. 12/798,957, filed on Apr. 14, 2010, now Pat. No. 8,387,864, which is a division of application No. 09/789,977, filed on Feb. 21, 2001, now abandoned.

(60) Provisional application No. 60/186,158, filed on Feb. 29, 2000.

(51) Int. Cl.
*G07F 19/00* (2006.01)

(52) U.S. Cl.
USPC .......................................... 235/379; 705/35

(58) Field of Classification Search
USPC ....................................... 235/379; 705/35, 45
See application file for complete search history.

(56) References Cited

U.S. PATENT DOCUMENTS 8,387,864 B1 * 3/2013 Blackson ...................... 235/379

* cited by examiner

*Primary Examiner* — Karl D Frech
(74) *Attorney, Agent, or Firm* — Black, McCuksey, Souers & Arbaugh, LPA

(57) ABSTRACT

A system and method for dispensing documents of value from an automated transaction machine that operates responsive to data read from data bearing records. The machine includes a card reader, cash dispenser, and display device. The machine can display data representative of selectable documents of value, such as a ticket that provides access to an entertainment event. After appropriate user selection and payment, the machine produces an electronic document corresponding to user selection. The machine can wirelessly dispense the electronic document to a mobile phone of the machine user. Information in the document corresponds to a description of value associated with the document. Unique information in the document enables the document to be authenticated with a validating device at a location where the document is to be redeemed.

22 Claims, 2 Drawing Sheets

AUTOMATED BANKING MACHINE THAT OPERATES RESPONSIVE TO DATA BEARING RECORDS

CROSS REFERENCE TO RELATED APPLICATIONS

This application is a continuation of U.S. application Ser. No. 12/798,957 filed Apr. 14, 2010, now U.S. Pat. No. 8,387,864, which is a divisional of U.S. application Ser. No. 09/789,977 filed Feb. 21, 2001 now abandoned, which claims benefit pursuant to 35 U.S.C. §119(e) of U.S. Provisional Application 60/186,158 filed Feb. 29, 2000, and the disclosure of each Application is herein incorporated by reference in its entirety.

TECHNICAL FIELD

This invention relates to automated transaction machines that operate responsive to data read from data bearing records, and may be classified in U.S. class 235, subclass 379.

BACKGROUND ART

Automated transaction machines that operate to carry out financial transactions responsive to data read from data-bearing records are known in the art. Such automated transaction machines that operate to cause financial transactions responsive to data that is read from data-bearing records could benefit from improvements.

OBJECTS OF EXEMPLARY EMBODIMENTS

It is an object of an exemplary embodiment to provide a system and method for producing and dispensing documents of value.

It is a further object of an exemplary embodiment to provide a system and method for producing and dispensing documents of value that have security properties that limit fraudulent duplication of the documents.

It is a further object of an exemplary embodiment to provide a system and method for producing and dispensing documents of value that have security properties that limit fraudulent modification of the documents.

It is a further object of an exemplary embodiment to provide a system and method for producing and dispensing documents of value that can be validated quickly and easily.

It is a further object of an exemplary embodiment to provide a system and method for producing and dispensing documents of value that includes encrypted information.

It is a further object of an exemplary embodiment to provide a system and method for producing and dispensing documents of value that includes encrypted information that can be used to validate the authenticity of the document.

It is a further object of an exemplary embodiment to provide a system and method for producing and dispensing documents of value that includes encrypted information that can be used to validate the authenticity of the document without comparing the encrypted information to a reference database.

It is a further object of an exemplary embodiment to provide a system and method for producing and dispensing documents of value that are uniquely associated with the individual acquiring the documents.

It is a further object of an exemplary embodiment to provide a system and method for producing and dispensing documents of value that are cryptographically signed.

It is a further object of an exemplary embodiment to provide a system and method for producing and dispensing documents of value that include indicia that correspond to the individual acquiring the documents.

It is a further object of an exemplary embodiment to provide a system and method for producing and dispensing documents of value that include encrypted indicia that correspond to the individual acquiring the documents.

It is a further object of an exemplary embodiment to provide a system and method for producing and dispensing documents of value that include encrypted information that is encrypted using a private key and is decrypted using a public key that corresponds to the private key.

Further objects of exemplary embodiments will be made apparent in the following Discussion and the appended claims.

The foregoing objects are accomplished in one exemplary embodiment by an automated transaction machine that is operative to dispense documents of value. Automated transaction machines are used to electronically carry out transfers representative of value. A common type of automated transaction machine is an Automated Teller Machine (ATM). For purposes of convenience all types of automated transaction machines will be referred to herein as an ATM unless otherwise specifically indicated.

In an exemplary embodiment the ATM includes at least one computer processor, at least one input device in operative connection with the computer processor, at least one output device in operative connection with the computer processor, and at least one printing device in operative connection with the computer processor. The printer device is operative to generate or otherwise produce documents of value which are dispensed to the user of the ATM. Examples of documents of value that can be produced with the ATM include tickets, money orders, traveler's checks, vouchers, due bills, gift certificates, gaming materials, coupons, rebates, and any other document that is representative of or which may be redeemed for something of value. The computer processor is operative to output with the display device a user interface with indicia that guides the user through the selection, purchase, and dispensing of documents of value with the ATM.

The exemplary embodiment of the ATM further includes an input device such as a card reader in operative connection with the computer processor. The card reader is operative to read account information from an article such as a bank card, credit card, debit card, or merchant card for example, which includes data which corresponds to an account or other source of value to which the purchase of the document of value will be charged. The card reader may also be operative to accept a smart card, or the machine may communicate with another portable source of stored value such as an electronic wallet, for receiving electronic money from the user to pay for the document of value. In addition or in the alternative, the computer processor may be operative to have the user manually input through the input device an account number, such as an account number for a credit card or debit card for example. Alternative embodiments may also include cash acceptors that are operative to accept currency in exchange for one or more documents of value.

The computer processor may be operative to cause output through the display device of a user interface that includes indicia representative of a selection of different types of documents of value that are available for a user to purchase. A user may select one or more desired documents of value for purchase by inputting commands with the input device that correspond to the desired documents of value. In an exemplary embodiment the computer processor is in operative connection with a host system that includes a data store of available types of documents of value and available amounts of value that correspond to different types of documents. The computer processor outputs the listing of documents of value available for purchase responsive to the information in the data store.

For example if the documents of value correspond to tickets for entertainment events, the computer processor is operative to communicate with the host to retrieve a listing of tickets that correspond to the particular type or specific event that the user of the machine is interested in purchasing. The user may then be presented with a listing of the tickets and descriptive information such as the name of the event, starting time, the location of the seat, and the cost per ticket. U.S. Pat. No. 6,023,688, which is incorporated herein by reference in its entirety, shows an example of such a system.

In alternative embodiments, documents of value may not correspond to a limited selection of items to purchase. For example if the documents of value correspond to gift certificates, the computer processor would be operative to print as many gift certificates as the user or multiple users are willing to purchase.

Once a selection of a particular document has been made, the computer processor is operative in an exemplary embodiment to have a printing device print indicia on a sheet or other dispensable material that corresponds to the document. In an exemplary embodiment the dispensable material includes a paper sheet. However, in alternative embodiments the dispensable material may include any medium that is operative to receive indicia that correspond to a document of value.

The indicia printed or otherwise included in a document of value may include a description of value for the document. The description of value may include a name, description, transaction number, issuer, recipient or other symbols or indicia which can be used to identify the document. The indicia may also include a value amount, monetary value or other material or information that is associated with the document. For example a gift certificate may include indicia corresponding to the name of the merchant who will accept the certificate, the person to whom it is issued and an amount of currency that the gift certificate represents. For tickets, the description of value may include the name, facility, event, category, section, date, time and/or seat location.

In addition to placing the description of value indicia with the document that is readable and understandable by a human, the computer processor in an exemplary embodiment is also operative to calculate and include encrypted indicia that correspond to the humanly readable indicia. The encrypted indicia are adapted to be read and decrypted by a validating device. The validating device outputs decrypted indicia that are readable by a human. A person validating the document can thus compare the humanly readable indicia included with the document to the decrypted indicia to verify that the document has not been altered.

For example if the document corresponds to a rebate coupon, the rebate coupon may have a certain amount of value associated with it, such as $10. Before a merchant gives the rebate, a validating device can be employed to decrypt the encrypted indicia. If the decrypted indicia correspond to a rebate value of $10 then the merchant has higher assurance that the rebate value has not been fraudulently altered.

In addition to encrypting indicia corresponding to the description of value or selected portions thereof, embodiments also encompass systems which provide for the encryption of information unique to the purchaser of the document. For example, if the ATM includes a card reader and the purchase of the document was made using a credit card for example, the computer processor may be operative to include in the encrypted indicia, data that corresponds to the credit card account number and/or the name of the account holder.

When the document is validated at the place where it is to be redeemed for value, the person validating the authenticity of the document can ask the person redeeming the document for additional forms of identification such as the original credit card that was used to make the purchase of the document, or a driver's license that shows the person's name. The output from the validating device may then be used to determine if the indicia corresponding to the description of value that is decrypted from the encrypted indicia included with the document corresponds to the person attempting to redeem the document.

Exemplary embodiments may use public key encryption to maximize reliability and facilitate use. The computer processor of the ATM may be operative to encrypt information for generating the encrypted indicia using a private key. A public key that corresponds to the private key can then be inputted into or otherwise made available to each remote validating device that is operative to validate the documents. A unique aspect of public key encryption is that the public key is only operative to decrypt information that was encrypted with the corresponding private key. Thus even if a forger can acquire the public key, the public key cannot be used by the forger to create forged documents with encrypted indicia that would correspond to the descriptive information on the face of a genuine document.

Alternative embodiments may be used to output documents of value in a non-tangible form. Such non-tangible items may be stored in a memory of a portable computer or article such as a PDA, and validated and/or redeemed electronically.

DISCUSSION

Figure 1:
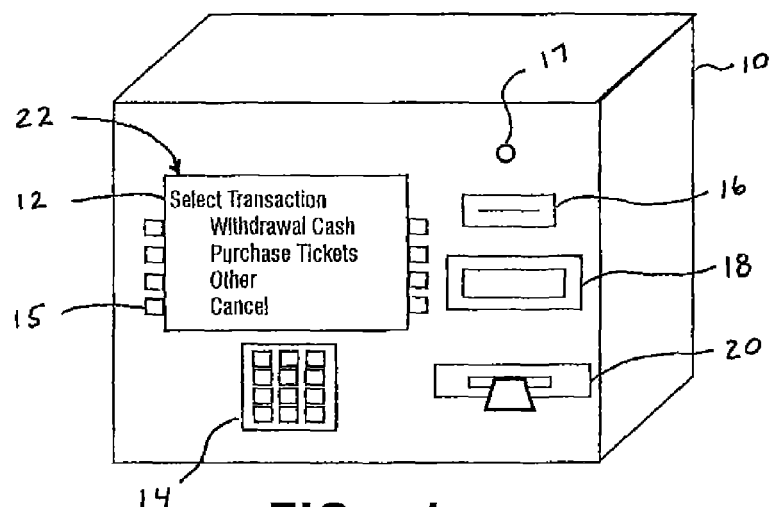
FIG. 1 shows a front perspective view representative of an exemplary automated transaction machine that is operative to dispense documents of value.

Methods for protecting documents of value from fraudulent modification and duplication are known in the prior art. The most common forms of documents of value include currencies; however, other forms of documents of value include checks, tickets, notes, stock certificates, or any other document that is representative of value. Many techniques for protecting such documents from fraudulent modification, duplication, and forgery have been used. Some techniques are thousands of years old, such as the marking of a document with a seal. Other techniques such as the use of special paper, complex engravings, and watermarks have been used for many years. More modern attempts to protect documents include the use of holograms and florescent inks.

Although these various techniques make it more difficult to forge documents, each form of protection can be overcome by a forger with sufficient skill and resources to accurately duplicate the particular anti-counterfeiting processes being used. All of these described techniques include the inherent limitation of being used in mass on numerous documents of value. Thus if a forger can produce a passable copy of the original seal, engraving plate, inks, or holograms, the forger can reproduce an unlimited number of forgeries of the document. This problem is especially acute with documents of value that are highly liquid such as cash. As the costs of color copiers, scanners, and printers have decreased, and print quality has improved, it has become easier to forge documents of value. Consequently, there exists a need for a system and method of limiting fraudulent duplication and modification of documents of value.

One method of limiting the maximum loss associated with forged documents is to mark each document with unique markings or indicia such as a serial number or bar code. This may be done with tickets to sporting events for example. As the user enters the facility for a sporting event, the unique bar code is scanned from a surface of the ticket and is compared to a database of valid tickets. If the ticket is valid, the person is admitted. If the ticket is invalid, the ticket can be further examined to determine if there is a mistake or if the ticket is a forgery.

Although such a validation process of unique documents of value is effective in limiting fraudulent copying and modifying of documents, the costs of implementing and maintaining the system can be quite prohibitive for many situations and venues. Such a system requires that each validation scanner be in communication with a common reference database of valid serial numbers or other identifying indicia. This is typically accomplished by connecting the scanners and database through a common network. Unfortunately, for many entities that wish to validate documents of value, it may be cost prohibitive to install and network a plurality of scanners at one or more facilities to perform online validation of the documents. This is especially true if the document may be valid at facilities that are spread over a large geographical area.

Consequently there exists a need for a system and method of producing and dispensing documents of value that can be validated with equipment that is less complex and less expensive to implement then a networked scanner system.

One technique to simplify the validation process may be used with traveler's checks. Traveler's checks are signed by their owner upon issue. To purchase goods, the owner of the traveler's checks must again sign the check. This enables the vender to verify that the prior signature and the current signature match before accepting the traveler's check. The vendor may also compare the name on the check and the signature to the person's driver's license or other separate piece of identification.

Although the individualized nature of traveler's checks is effective in combating fraud, the amount of time it takes to have the owner sign the check and compare signatures limits their usefulness in some applications. Validating tickets to a concert for example by having patrons individually sign each ticket would be highly impractical and result in patrons waiting in significantly long lines before entering the venue. Consequently, there exists a need for a system and method for producing and dispensing documents with unique information that can be used to economically verify the authenticity of the document, and which enables the authenticity of the document to be verified faster and more accurately.

Referring now to the drawings and particularly to FIG. 1, there is shown therein a front perspective view of an exemplary ATM 10. The ATM includes input and output devices. ATM 10 includes a display device 12, manual input devices such as a keypad 14 and function keys 15, a card reader 16, a wireless communications device 17, a cash dispenser 18, and a document dispenser 20. In an exemplary embodiment the ATM 10 is operative to dispense currency with the cash dispenser 18, and to dispense documents of value with the document dispenser 20 and the wireless communications device 17. The dispensing of currency and documents of value is performed responsive to user inputs entered through the card reader 16, input devices 14, 15 and communications device 17. The display device 12 is used by the ATM 10 to output user interface indicia 22 that corresponds to information useful to a customer in operating the ATM.

In the exemplary embodiment the input devices receive information that identifies a user and/or the user's accounts, as well as instructions from the user. In the case of ATM 10 the input of a card to the card reader 16 may provide information or data concerning the user and/or the user's account. When a debit card is used, input of a PIN to the keypad 14 further verifies the identity of the user. Data and instructions are input through the keypad 14 and the function keys 15 by a user in operating the machine. However, in alternative embodiments, the ATM may include other types of input devices 14 that are operative to accept inputs for identifying a user and/or for operating the ATM. Other exemplary input devices may include a touch screen, speech or voice recognition devices, biometric readers, track ball, mouse or touch pad. Embodiments may accept identifying inputs from a wireless communications device such as a personal digital appliance (PDA), cell phone, notebook computer, portable computer or similar device. Data stored within such a device may serve to identify a user, their accounts and/or the particular device.

Figure 2:
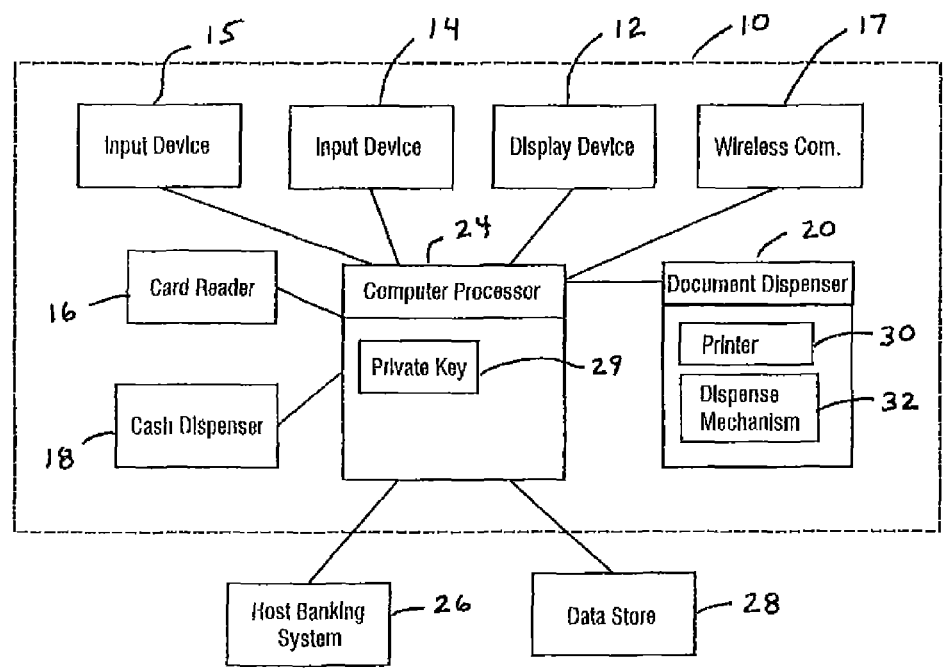
FIG. 2 is a schematic view representative of components which comprise an exemplary automated transaction machine.

FIG. 2 shows a schematic view of components that are included in the exemplary ATM 10. ATM 10 includes at least one computer processor 24. In the exemplary embodiment computer processor 24 is in operative connection with the display device 12, the keypad 14, function keys 15, the card reader 16, the cash dispenser 18, device 17 and the document dispenser 20. The computer processor 24 is in operative connection with at least one data store schematically indicated 28. The data store 28 is operative to store programmed instructions and data. Such stored data may include records representative of documents that may be and/or have been dispensed with the ATM.

The computer processor 24 includes or is operative to access programmed instructions in the at least one data store 28 that enable the ATM to interact with users for dispensing cash and dispensing documents of value. In the exemplary embodiment the programmed instructions are operative to cause the card reader 16 to read account information from a customer's card. The exemplary embodiment is operative to read account information from magnetic stripe cards such as credit cards and debit cards. However, alternative embodiments are operative to read account information from a portable medium that is operative to store user or account related information such as a smart card, smart rings, RF backscatter devices and computing devices such as PDAs, portable computers, and mobile phones, all of such intelligent types of devices and media being referred to herein as PDAs.

The computer processor 24 is in operative connection with at least one host system 26. In the exemplary embodiment the host system 26 includes one or more remote computers that comprise a financial transaction system such as a banking system. In other embodiments other systems which may be used to transfer or authorize value or transactions, may be accessed. The computer processor 24 is operative to cause the ATM to communicate with the host banking system 26. Such communications in the exemplary embodiment enable the ATM and the host to verify the authority of a user to operate the system, determine account information, debit an account for a withdrawal of cash, and charge an account for the purchase and dispense of a document of value. Of course in other embodiments other transaction types may be conducted and other functions performed. U.S. application Ser. No. 09/789,977 filed Feb. 21, 2001, which is herein incorporated by reference in its entirety, shows an example of an automated banking machine and host relationship.

In the exemplary embodiment the data store 28 is local to the ATM. However, it should be understood that in alternative embodiments the data store 28 may be remote from the ATM 10. The computer processor 24 may access information in one or more data stores through a private or a public network such as the Internet. Networked data stores may further be operative to communicate with a plurality of ATMs or other terminals. For example, if the data store is associated with a web site on the Internet, a plurality of ATMs employing principles of an exemplary embodiment may be configured to query the web site for records in the data store that correspond to documents that may be dispensed by the ATMs. In addition, ATMs employing the principles of exemplary embodiments may be configured to communicate with the web site to update the data store with records of documents of value that have been dispensed by the ATMs. Of course in other embodiments other methods of accessing information, programmed instructions and data may be used.

In the exemplary embodiment, documents of value may be generated by the ATM by printing indicia on a dispensable material or article. An exemplary dispensable article includes a paper or cardboard sheet. The dispensable material or article may include any medium that is adapted to hold printable or otherwise placeable indicia, including for example plastic cards, ticket stock, adhesive labels, copy protected paper, electronically modifiable sheet materials and material subject to change in response to temperature. Such indicia may be humanly readable, readable by a machine or combinations thereof. In alternative embodiments the dispensable material may be a non-tangible item that is dispensed from the ATM by being transmitted and recorded into memory of a portable article such as a PDA. While the tangible materials dispensed by exemplary embodiments may be referred to herein as documents of value, it should be understood that when used herein a document of value also refers to and includes a non-tangible item which may have value or which may be redeemed for value, such as goods, services or currency.

In an exemplary embodiment, the document dispenser 20 includes a printing device 32 that is operative to print indicia on the dispensable material responsive to operation of the computer processor. The indicia are printed on the dispensable material to produce a document of value. In the exemplary embodiment the document dispensing device directs the document out through an opening in the fascia of the ATM so that it may be taken by the customer. However, alternative embodiments of the document dispenser 20 may include additional dispensing mechanisms 32 that are operative to move the document of value from the printing device 30 to a dispense location in the ATM. Alternatively documents of value which are non-tangible items may be dispensed from the ATM through the wireless communications device 17 which for this purpose serves as an output device. In an exemplary embodiment the ATM is enabled to dispense documents of value selectively in either tangible or non-tangible form in response to one or more inputs to input devices in operative connection with the processor.

The computer processor 24 of the exemplary embodiment has access to an electronic private encryption key 29. The private key may be stored in one or more local data stores in connection with the processor. The private key may be alternately accessed from one or more security modules connected in or to the ATM. The private key may alternately be derived from data stored in and/or accessible by the ATM. The ATM 10 is operatively programmed to encrypt information using the private key 29, such that only a corresponding public key is able to decrypt the information.

Figure 3:
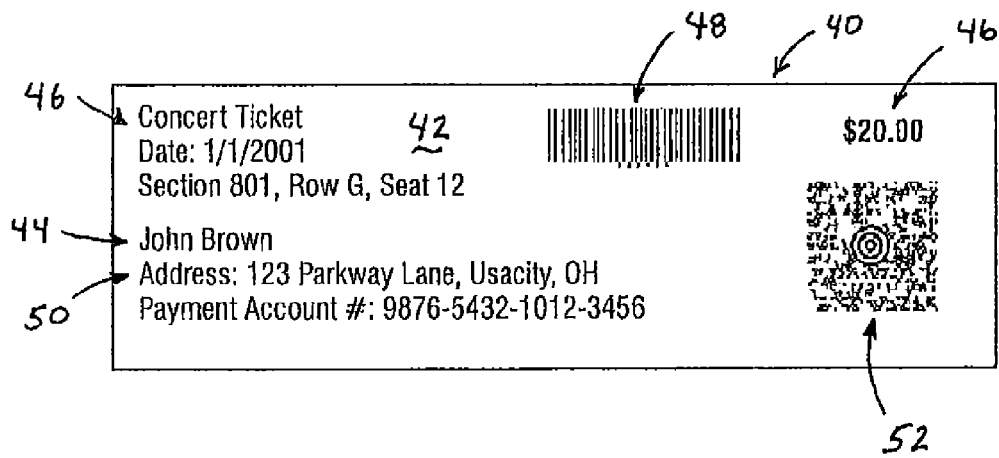
FIG. 3 is representative of an exemplary document of a value that may be dispensed from the automated transaction machine.

FIG. 3 is representative of an exemplary document of value 40. The document of value 40 is a tangible article comprised of a dispensable material 42 that includes a plurality of printed indicia 44. The printed indicia 44 may be comprised of inks, pigments, or toner material that is applied to the dispensable material 42. However, in alternative embodiments the printed indicia 44 may be created by structurally modifying the dispensable material such by heating, deforming, irradiating, magnetizing, punching, or cutting portions of the dispensable material to form viewable indicia. Alternative forms may include documents which have indicia which are not visible and which may be detected or read using a sensing device.

The exemplary document of value 40 as shown in FIG. 3 is representative of a ticket that has been printed and dispensed by the ATM 10. The exemplary embodiment encompasses the printing and dispensing of other types of documents of value as well, including for example passes, money orders, traveler's checks, bank checks, pay checks, vouchers, due bills, gift certificates, coupons, rebates, scrip and any other document or material that is representative of or which may be redeemed for value. Such documents of value may be dispensed by certain embodiments in either tangible or non-tangible form.

One or more portions of the indicia printed by the ATM on the exemplary document 40 corresponds to readable indicia which comprises a description of value 46. The description of value 46 may include a monetary value such as $20, or any other description information that is representative of the type or amount of value, the type of document, or circumstances or criteria pertinent to the document or the use or purpose thereof. For example a ticket to a concert may include indicia that correspond to the facility, section, time, date, artist, promoter, seat location and/or other information concerning a particular concert. A coupon for example may include indicia representative of a discount percentage when purchasing a certain type of good or service, the product, the issuer, the entity that will redeem the coupon and other information. The description of the good or service and the discount percentage may correspond to the description of value on exemplary documents of value. In the exemplary document 40 the value information 46 is printed in a format that is humanly readable such as an alphanumeric description. However, alternative embodiments may include machine readable value information 48 such as a bar code on a tangible article. Alternatively the indicia may be included with other data that comprises an electronic document of value. The description of value included with a document may include appropriate types of information pertaining to the use, purpose, authorized holder, redemption, value, history, or processes associated with a document of value, and will vary with the type and nature of the document.

The exemplary ATM 10 is operative to assess a charge to a customer in exchange for the generation and dispensing of a document of value. This charge is typically made by the ATM charging the purchase amount to an account of the customer such as a credit card account or debit card account. In response to a customer giving value for a document of value, the exemplary ATM 10 is operative to print or produce one or more documents of value that are uniquely associated with the customer. In the case of exemplary document 40, this is accomplished by printing humanly readable buyer information indicia 50 on the document of value. The buyer information is included within the description of value and may include descriptive information unique to the customer such as the buyer's name and/or the account number used to purchase the document of value. When the document is redeemed a person validating the authenticity of the document can compare buyer information on the document of value to the driver's license and/or the data on the card that was used to purchase the document of value held by the person presenting the document.

The ATM 10 is further operative to print machine readable encrypted information indicia 52 on the exemplary document of value 40. For example as shown in FIG. 3, the encrypted indicia 52 includes a two-dimensional bar code. The encrypted indicia correspond to encrypted information that is generated by the computer processor 24 through a cryptographic process such as public key cryptography. In the exemplary embodiment computer processor 24 uses the private key 29 in executing programmed steps which comprise a cryptographic process to encrypt portions of the description of value that is associated with the document of value. The resulting encrypted information can be used to authenticate the document, including for example the value information 46 and the buyer information indicia 50. Of course while in this exemplary embodiment the encrypted information corresponds to buyer and value information, in other embodiments the encrypted information may correspond to all or any portion of the description of value. It should be understood that while the encrypted information is recorded on the tangible media of the exemplary document, such information may also be included in electronic documents that are dispensed by the ATM.

The cryptographic process used in the exemplary embodiment requires that each private key have a corresponding public key. The public key is used in the cryptographic process in the exemplary embodiment to decrypt the value information and buyer information from the encrypted information. The unencrypted value information indicia 46 and/or the buyer information indicia 50 printed on the document can then be compared to the decrypted value and buyer information derived from the encrypted indicia 52. If such values do not match or do not have some other corresponding relationship, the document of value is suspect and may have been forged or altered. Examples of cryptographic processes that may be employed in exemplary embodiments include PGP, RSA, other generally secure private/public key process or other encryption approach. Of course it should be understood that while in this embodiment the encrypted information corresponds to value and buyer information, in other embodiments the encrypted information may correspond to portions of the description of value associated with the document, such as only one of these types of information and/or other or additional types of information, or combinations thereof. In alternative embodiments the description of value information may include electronic information identifying the user, their accounts or their PDA.

Although in the exemplary document 40 the indicia corresponding to value and buyer information 46 and 50 may be relatively easy to fraudulently alter or reproduce on a counterfeit document, the encrypted information is extremely difficult to produce fraudulently or alter so as to correspond to fraudulent value and buyer indicia. Even if a forger has access to the public key, the cryptographic process used in the exemplary embodiment does not enable a public key to produce encrypted information that will correspond to information encrypted with the secret, private key.

For example, as shown in FIG. 3, the exemplary ticket document 40 includes value indicia representative of a seat location in section 801. A forger could attempt to produce an altered version of the ticket for section 101 by scanning in the document with a computer scanner; altering the scanned image with an editing program; and printing the altered image of the document with a computer printer. However, such a forged document of value can be easily detected. The encrypted indicia 52, when decrypted would reveal value information that corresponds to section 801, not section 101. Any attempt to alter the encrypted indicia 52 would in many cases make the encrypted indicia incapable of producing meaningful data. Such a condition identifies the document as suspect. Unless the forger can acquire the original private key used to generate the encrypted information, the forger would not be able to alter the encrypted indicia so as to correspond with the forged value indicia and/or buyer indicia.

Figure 4:
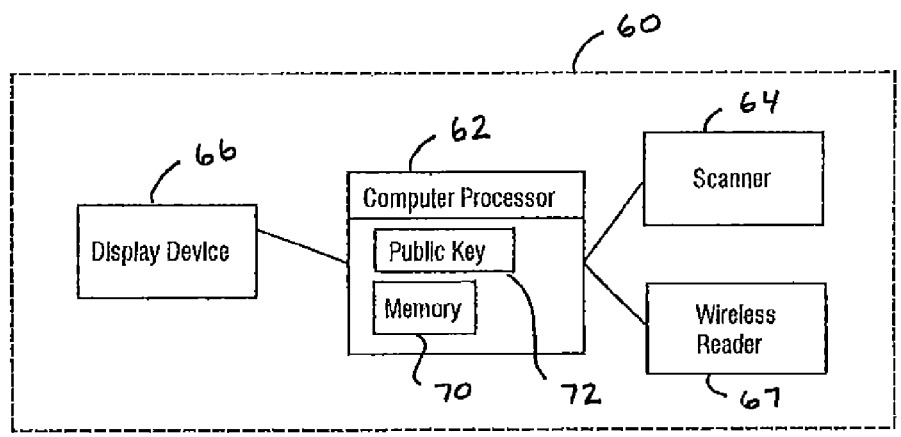
FIG. 4 is a schematic view representative of components of an exemplary validating device that is operative to validate documents of value which have been produced in accordance with principles of exemplary embodiments.

FIG. 4 is a schematic view of an exemplary validating device 60. Validating device 60 is operative to read and decrypt the encrypted indicia 52 printed on the exemplary document 40. The validating device 60 includes at least one computer processor 62. The computer processor 62 is in operative connection with a reading device such as a scanner 64, a wireless communications device 67 which may serve as a reader, and a display device 66. The computer processor 62 has a public encryption key 72 accessible thereto. The public key may be stored in a data store in connection with the processor and may be locally or remotely stored. The public key 72 corresponds to the private key 29 used to encrypt the encrypted indicia 52 that is read. The validating device is operative to receive the encrypted indicia 52 from the document of value. Data corresponding to the indicia received is stored in memory 70 in operative connection with the computer processor. The computer processor 62 operates in accordance with its programming to decrypt the description of value information corresponding to the encrypted indicia 52 through use of the public key 72. The computer processor is further operative to cause the decrypted value and buyer information to be output through the display device 66.

In the exemplary embodiment when the customer attempts to redeem the document of value 40, this described validating device 60 is employed to read the document of value and display the decrypted value and buyer information. The decrypted description of value data is compared to the description of value data associated with the document of value. If the decrypted data matches or corresponds with data or indicia which are printed on the document, this is an indication that the document is genuine. If the decrypted value and buyer information does not match or properly correspond with the value and/or buyer information, indicia 46 and 50 printed on the document, the document of value may be identified as suspect. The proprietor of the establishment where the document is presented may reject the document as a possible forgery.

If the document of value is validated through operation of the validating device 60, the buyer information may additionally be compared to the driver's license or data on the credit or other card used by the person presenting the document to purchase such document. Such comparison further verifies that the person presenting the document is the original buyer of the document.

For certain applications of exemplary embodiments, the customer may have privacy concerns about the buyer information being printed on the document of value. Consequently, in an alternative embodiment, the document of value can be printed by the ATM 10 without the buyer indicia 50 being included on the document. However, in some embodiments the buyer information may still be encrypted as part of the encrypted indicia 52. Although a person authenticating the document with a validating device 60 would have access to the buyer information, persons who do not have access to a validating device 60 or the public key would not be able to recover the buyer information from the document.

It should be understood that similar approaches may be used for validating electronic documents of value such as those stored in a PDA. In such embodiments the data which comprises the document of value may be communicated to the validating device through the wireless communication device 67 through wireless methods such as RF or IR. The validating device would read the indica included in the electronic document and validate the genuineness thereof in a manner similar to that discussed for indicia included in tangible documents. Of course in alternative embodiments other approaches may be used.

If the document of value that is analyzed through operation of the validating device is determined to be genuine, value is then given for the document. The value may have various forms in embodiments such as goods, services or currency. Upon the document being redeemed the document is invalidated. This may be done in the case of tangible documents by taking all or a part of the document from the user, marking, tearing or modifying the document. In the case of a non-tangible document invalidating the document may include operating the validating device and/or the PDA so that the document is erased or indicated as no longer valid. This may be done by modifying, adding or erasing data which comprises the document. Various approaches may be used for invalidating the document of value depending on the circumstances.

It should be understood that the techniques and devices described herein are exemplary. Alternative types of data may be encrypted and decrypted on or from documents of value or other items to verify the genuineness thereof. Alternative approaches may also be used for correlating the document with a person authorized to redeem it. Various combinations of information or data read from documents or other items to verify genuineness or authority to redeem may be used in other embodiments.

Thus, the automated transaction machine for producing and dispensing documents of value that may be verified as genuine, and the associated systems and processes, achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims, any feature described as a means for performing a function shall be construed as encompassing any means known to those skilled in the art to be capable of performing the recited function, and shall not be limited to the features and structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, and relationships are set forth in the appended claims.

I claim:

1. Apparatus comprising:
an automated transaction machine,
   wherein the machine includes at least one input device,
   wherein the machine includes at least one data reader,
      wherein the at least one data reader is operable to read customer data that is usable to identify a financial account,
   wherein the machine is associated with at least one computer that is operable to allow a customer to carry out a financial transaction involving a transfer of funds, responsive at least in part to computer-determined correspondence between:
      customer data read by the at least one data reader, and
      authorized customer identification data stored in at least one authorized customer information data store;
   wherein the machine includes at least one display device,
      wherein the machine is operable to display through the at least one display device, indicia representative of a plurality of selectable non-cash documents of monetary value,
         wherein the non-cash documents include a first document,
            wherein the first document is associated with first unique document data,
   wherein the machine is operable to receive from the customer through the at least one input device, at least one selection input corresponding to selection of at least one document of the non-cash documents, including receiving selection of the first document,
      wherein the machine is operable responsive at least in part to receiving selection of the first document, to allow the customer to provide payment of a monetary value associated with the first document, which causes an electronic document to be provided to the customer in a manner that allows the electronic document to be wirelessly received by the mobile device,
         wherein the electronic document includes the first unique document data,
         wherein the electronic document includes unique information that is usable to authenticate the electronic document as being associated with at least one entity.

2. The apparatus according to claim 1
wherein the machine is part of a banking system that includes a plurality of automated transaction machines,
wherein the at least one display device comprises a touch screen display, wherein the at least one input device includes the touch screen display,
wherein the at least one data reader includes a card reader and a biometric reader,
wherein the machine includes at least one processor and a cash dispenser,
   wherein each machine is operable to carry out a cash withdrawal transaction that involves the cash dispenser,
wherein the at least one processor is operable to cause the cash dispenser to dispense cash to an authorized customer responsive at least in part to transaction authorization received from a financial transaction host which is operable to:
    cause card data read by the card reader and card information stored in the at least one authorized customer information data store to be compared for a predetermined card relationship,
    cause biometric data read by the biometric reader and biometric information stored in the at least one authorized customer information data store to be compared for a predetermined biometric relationship, and
    cause the read card data and the read biometric data to be compared for a predetermined customer relationship;
wherein the at least one processor is operable to:
    (i) cause the card reader to read card data;
    (ii) cause the biometric reader to read biometric data;
    (iii) communicate to the financial transaction host, the card data read in (i) and the biometric data read in (ii);
    (iv) receive authorization from the financial transaction host for a cash dispense transaction, responsive at least in part to each of:
        the card data read in (i) and the card information having the predetermined card relationship,
        the biometric data read in (ii) and the biometric information having the predetermined biometric relationship, and
        the card data read in (i) and the biometric data read in (ii) having the predetermined customer relationship;
    (v) cause the cash dispenser to dispense cash, responsive at least in part to (iv); and
    (vi) cause a financial transfer associated with the cash dispensed in (v), wherein the financial transfer involves the financial account.

3. The apparatus according to claim 1
wherein the machine is operable to display through the at least one display device, indicia representative of a plurality of selectable non-cash documents which comprise tickets to an event,
    wherein the machine is operable to receive at least one selection input corresponding to selection of a first ticket to the event,
        wherein the machine is operable to cause to be provided to the customer, an electronic ticket that provides access to the event,
            wherein the electronic ticket corresponds to the first ticket,
            wherein the electronic ticket includes information corresponding to the event.

4. The apparatus according to claim 3 wherein the machine includes a wireless communication device, wherein the mobile device comprises a mobile communication device,
    wherein the wireless communication device is operable to wirelessly communicate the electronic ticket to the customer in a manner that allows the electronic ticket to be wirelessly received by the mobile communication device.

5. The apparatus according to claim 4 wherein the at least one data reader is operable to receive identifying data from the mobile communication device,
    wherein the wireless communication device is operable to wirelessly communicate the electronic ticket to the mobile communication device in a format that is based at least in part on the identifying data received from the mobile communication device,
    wherein the at least one entity includes at least one of:
        an entity authorized to issue the electronic ticket, or
        the customer.

6. A method comprising:
(a) operating an automated transaction machine to receive identifying data from a customer using the machine,
    wherein the machine includes at least one data reader,
        wherein the at least one data reader is operable to read account identifying data from data bearing records,
    wherein the machine is associated with at least one computer operable to cause account identifying data read by the at least one data reader to be compared with information in at least one data store,
        wherein a machine user is authorized to use the machine to request a financial transaction involving a transfer of funds responsive at least in part to correspondence between read account identifying data and the information;
(b) operating at least one display device of the machine to display indicia representative of a plurality of selectable tickets of monetary value;
(c) subsequent to (b), operating the machine to receive from the customer, selection of a first ticket of the tickets,
    wherein the first ticket is associated with first unique ticket data; and
(d) operating the machine responsive at least in part to the selection received in (c), to allow the customer to provide first ticket payment which causes an electronic ticket to be provided to the customer in a manner that allows the electronic ticket to be wirelessly received by the mobile device,
    wherein the electronic ticket corresponds to the first ticket,
        wherein the electronic ticket includes the first unique ticket data,
    wherein the electronic ticket includes unique information that is usable to authenticate the electronic ticket as being associated with at least one entity.

7. The method according to claim 6
wherein the machine is part of a banking system that includes a plurality of automated transaction machines,
wherein the machine includes at least one processor, a cash dispenser, a card reader, and a biometric reader,
    wherein the machine is operable to carry out a cash withdrawal transaction,
wherein the at least one processor is operable to cause the cash dispenser to dispense cash to an authorized machine user responsive at least in part to transaction authorization received from a financial transaction host,
wherein the at least one processor is operable to:
    cause card data to be read through operation of the card reader, and
    cause biometric data to be read through operation of the biometric reader;
and further comprising:
    (e) operating the card reader to read card data;
    (f) operating the biometric reader to read biometric data; and
    (g) operating the at least one processor to allow the machine user to request a financial transaction involving the cash dispenser, responsive at least in part to:
        computer-determined correspondence between the card data read in (e) and stored card information,
        computer-determined correspondence between the biometric data read in (f) and stored biometric information, and computer-determined correspondence between the card data read in (e) and the biometric data read in (f).

8. The method according to claim 6 wherein (b) includes displaying indicia representative of a plurality of selectable tickets which each provide access to an event, and wherein the electronic ticket provides access to the event.

9. The method according to claim 8 wherein in (d) the at least one entity includes at least one of:
an entity authorized to issue the electronic ticket, or
the customer.

10. The method according to claim 6 wherein the mobile device comprises a mobile communication device, wherein in (a) the identifying data identifies the mobile communication device, and further comprising:
(e) operating the machine to cause the electronic ticket to be wirelessly communicated, based at least in part on the identifying data received in (a), to the mobile communication device.

11. The method according to claim 6 and further comprising:
(e) operating the machine to produce the electronic ticket.

12. The method according to claim 6 wherein the machine includes a wireless communication device, wherein the mobile device comprises a mobile communication device, and further comprising:
(e) operating the wireless communication device to wirelessly send the electronic ticket to the mobile communication device.

13. The method according to claim 6 wherein the mobile device comprises a mobile communication device,
wherein (d) includes operating the machine to allow the customer to provide payment which causes a remote ticket host to wirelessly send the electronic ticket to the mobile communication device.

14. A method comprising:
(a) operating an automated transaction machine to receive from an authorized customer associated with a mobile device, customer selection of at least one non-cash document of monetary value,
wherein the at least one non-cash document includes a first non-cash document,
wherein the first non-cash document is associated with first unique document data; and
(b) operating the machine responsive at least in part to the customer selection received in (a) to allow the customer to provide customer selection payment which causes at least one electronic document to be provided to the customer in a manner that allows the at least one electronic document to be wirelessly received by the mobile device,
wherein the at least one electronic document corresponds to the at least one non-cash document,
wherein the at least one electronic document includes a first electronic document,
wherein the first electronic document includes the first unique document data,
wherein the first electronic document includes unique information that is usable to authenticate the first electronic document as being associated with at least one entity.

15. The method according to claim 14
wherein the machine is part of a banking system that includes a plurality of automated transaction machines, wherein the machine includes at least one processor, a cash dispenser, a card reader, and a biometric reader,
wherein the machine is operable to carry out a cash withdrawal transaction,
wherein the at least one processor is operable to cause the cash dispenser to dispense cash to an authorized user responsive at least in part to transaction authorization received from a financial transaction host which is operable to:
cause card data read by the card reader and card information stored in at least one authorized user information data store to be compared for a predetermined card relationship,
cause biometric data read by the biometric reader and biometric information stored in the at least one authorized user information data store to be compared for a predetermined biometric relationship, and
cause the read card data and the read biometric data to be compared for a predetermined user relationship;
and further comprising:
(c) operating the at least one processor to cause the card reader to read card data;
(d) operating the at least one processor to cause the biometric reader to read biometric data;
(e) operating the at least one processor to communicate to the financial transaction host, the card data read in (c) and the biometric data read in (d);
(f) operating the at least one processor to receive authorization from the financial transaction host for a cash dispense transaction, responsive at least in part to each of:
the card data read in (c) and the card information having the predetermined card relationship,
the biometric data read in (d) and the biometric information having the predetermined biometric relationship, and
the card data read in (c) and the biometric data read in (d) having the predetermined user relationship;
(g) responsive at least in part to (f), operating the at least one processor to cause the cash dispenser to dispense cash; and
(h) operating the at least one processor to cause a financial transfer associated with the cash dispensed in (g).

16. The method according to claim 14 wherein in (b) the mobile device comprises a mobile phone.

17. The method according to claim 14 wherein each respective non-cash document of monetary value comprises a respective ticket, wherein the first non-cash document comprises a first ticket,
wherein (a) includes receiving customer selection of the first ticket, and wherein the first electronic document comprises a first electronic ticket that corresponds to the first ticket.

18. The method according to claim 17 wherein the machine includes at least one display device, and further comprising:
(c) prior to (a), operating the at least one display device to display indicia representative of a plurality of selectable tickets which each provide access to an event;
wherein the first electronic ticket provides access to the event.

19. The method according to claim 17 wherein in (b) the at least one entity includes at least one of:
an entity authorized to issue the first electronic ticket, or
the customer.

20. The method according to claim 17 wherein in (b) the mobile device comprises a mobile communication device, and further comprising:
(c) operating the machine to receive identification data from the customer;

wherein (b) includes operating the machine to allow the customer to provide customer selection payment which causes the first electronic ticket to be wirelessly communicated to the mobile communication device in an encrypted format that is based at least in part on the identification data received in (c).

21. The method according to claim 17 wherein the mobile device comprises a mobile communication device,
wherein (b) includes operating the machine to allow the customer to provide customer selection payment which causes a remote ticket host to wirelessly send the first electronic ticket to the mobile communication device.

22. The method according to claim 14 wherein in (b) the mobile device comprises a mobile communication device, and further comprising:
(c) operating the machine to wirelessly send the at least one electronic document to the mobile communication device.

* * * * *